United States Patent [19]

Marasigan, Jr.

[11] Patent Number: 4,828,302
[45] Date of Patent: May 9, 1989

[54] CAR DOOR DENT PROTECTOR

[76] Inventor: Eliodoro M. Marasigan, Jr., 5670 Coldwater, Castro Valley, Calif. 94552

[21] Appl. No.: 147,504

[22] Filed: Jan. 25, 1988

[51] Int. Cl.$^4$ ............................................. B60K 19/42
[52] U.S. Cl. ................................. 293/128; 296/207; 280/770
[58] Field of Search ................... 293/128, 124, 126, 1; 296/152, 207; 280/770

[56] References Cited

U.S. PATENT DOCUMENTS

| | | | |
|---|---|---|---|
| 2,611,637 | 9/1952 | Neslund | 293/128 |
| 2,675,983 | 4/1954 | King | 293/128 |
| 3,243,223 | 3/1966 | Hoshell | 293/128 |
| 3,288,512 | 11/1966 | Zientara | 293/128 |
| 3,367,702 | 2/1968 | Sauer | 293/128 |
| 3,882,574 | 5/1975 | Martinez | 293/128 |
| 3,982,780 | 9/1976 | Keith | 293/128 |
| 4,002,363 | 1/1977 | James | 293/128 |
| 4,674,783 | 6/1987 | Hogan | 296/207 |

FOREIGN PATENT DOCUMENTS 689935 7/1964 Canada ................................ 293/128

Primary Examiner—James B. Marbert
Attorney, Agent, or Firm—Julian Caplan

[57] ABSTRACT

A protector to prevent opening of doors of adjacent vehicles from denting a car door is disclosed. The protector has a hollow outer tube which may be shortened to proper size to fit the door. In cross-section, the tube has a rounded protuberance on its outside and a curved bottom with outward extending feet to prevent the tube from turning once it is applied. Within the outer tube is a highly resilient core of rubber or plastic material (also capable of being cut to a length less than the width of the car door) and hooks are screwed into the ends of the core. The hooks engage the vertical side edges of the door to hold the protector in place. Alternatively the protector may be formed of a single piece of resilient rubber or plastic material which may be cut to size and hooks screwed into the ends.

4 Claims, 1 Drawing Sheet

CAR DOOR DENT PROTECTOR

BACKGROUND OF THE INVENTION

1. Field of the Invention

This invention relates to a new and improved protector which is adjustable to fit different width car doors and when applied protects the doors from being dented by the doors of adjacent cars being opened.

2. Related Art

There have been many attempts to protect car doors from being dented, examples of which are listed on the accompanying Form 3.72. One of the problems in popularizing such protectors is that they must preferably be adjustable for different widths of doors. The latter problem has occasioned elaborate means for adjustment, one common means being the use of coil springs positioned within a hollow tube protector. Other adjustment means involve fastener attachments of the hooks which fit around the door side edges to the ends of the protector.

The present invention has the advantage that it may be cut to length appropriate for the width of the vehicle door and that the protector is provided with sufficient resiliency so that the hooks on either end of the protector securely grips the door side edges. Further, the cross-sectional shape of the protector is such that it does not turn during use and hence the screws which fit into either end are not dislodged.

SUMMARY OF THE INVENTION

The protector has a cross-sectional shape having a rounded central outer portion which projects outward of the door facing a sufficient distance to protect the facing against dents. The inner surface of the cross-sectional shape is curved to fit flush against the door facing which engages the door surface and prevent the protector from turning. The protector may be made of a soft plastic, rubber or rubber-like material which is colored in various colors to match the paint of a variety of vehicles.

In a preferred form of the invention, the protector is hollow and within the hollow is a core of resilient soft plastic, rubber or rubber-like material. Hooks to engage the side edges of the door are secured to either end of the core. Initially the protector and the core are cut shorter than the width of the car door and hence the hooks which are screwed into either end of the core securely engage the door side edges. In another modification, the entire protector is one piece and is made of a resilient soft plastic, rubber or rubber-like material, but its cross-sectional shape resembles that of the preceding modification except in smaller proportions.

Other objects of the present invention will become apparent upon reading the following specification and referring to the accompanying drawings in which similar characters of reference represent corresponding parts in each of the several views.

IN THE DRAWINGS

DESCRIPTION OF PREFERRED EMBODIMENTS

Figure 1:
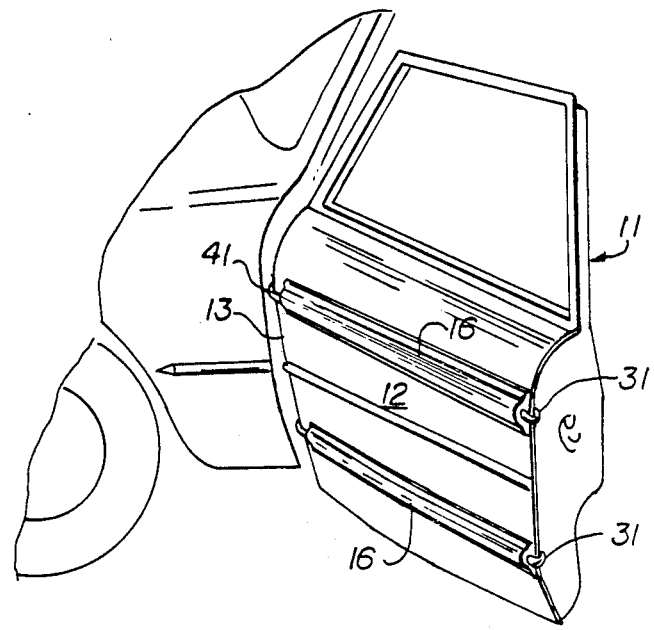
FIG. 1 is a schematic perspective view showing two protectors applied to a car door.

In FIG. 1 a conventional car door 12 is shown, it being understood that one of the features of the invention is the fact that it is adjustable to fit a wide variety of different door shapes and sizes depending upon the model of car to which it is applied. Door 11 has a facing 12 which is generally of curved shape and has substantially vertical front and rear edges 12 which in common construction project from the ends of the car door sufficiently so that they may be gripped by the hooks of the protector hereinafter described. In FIG. 1 there are two protectors 16 illustrated, it being understood that one or more protectors may be applied depending upon the configuration of the facing 12.

Figure 4:
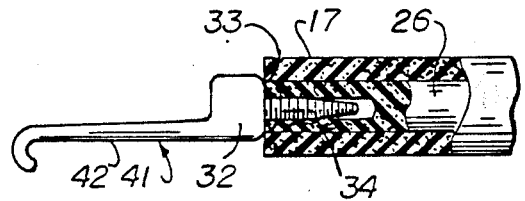
FIG. 4 is a view of the end of the protector opposite that of FIG. 3.
Figure 3:
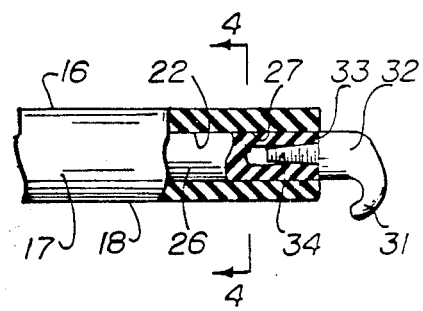
FIG. 3 is a further enlarged fragmentary view of one end of a protector partially broken away to reveal internal construction.

The protector 16 comprises an outer member 16 best shown in cross-section in FIG. 4 having a rounded outer face 17 which extends outward from the facing 12 a sufficient distance so that the edge of the door of a vehicle parked adjacent to that to which the present device is applied engages the surface 17 rather than the facing 12 and hence the latter is protected against being dented. The inner surface 18 of protector 16 is preferably slightly concave so that it fits flush against the facing 12 when stretched even if the latter is somewhat curved. Top and bottom outward extensions 19 engage the facing 12 and because the width across the extension 19 is greater than the rounded outer face 17, the protector 16 is restrained against rotation about its central axis. The transition from surface 17 to extension 19 is accommodated by curved fillets 21. A longitudinally extending central hole 22 extends the length of the tube 16.

Within the hole 22 is a core 26 of a material considerably more elastic than that of the outer tube 16 and formed of soft plastic, resilient rubber or rubber-like material. For convenience, the material is referred to in this specification and in the accompanying claims as "resilient material". A hole 27 may be formed in one end or through the entire length of core 26 for easy attachment of a hook 31.

Figure 2:
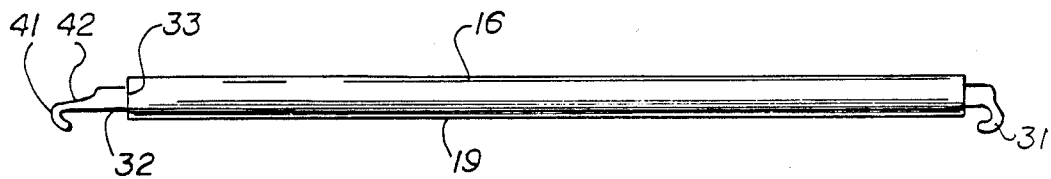
FIG. 2 is an enlarged plan view of a protector.

Hook 31 is of rubber-coated metal or solid, hard but flexible plastic material. It has a base 32 of a diameter about equal to core 26 formed with a shoulder 33 which abuts the end of core 26. A screw 34 extends from shoulder 33 and is screwed into the end of core 26 and preferably into hole 27. At the opposite end of protector 16 is a second hook 41. As shown in FIGS. 2 and 4, hook 41 has an extended shank 42. In many styles of car doors, it is desirable that shank 42 be used so that the end of the protector does not inhibit full opening of the door.

In use, tube 16 and core 26 are cut to length, depending on the width of door 16. Preferably one hook 31 or 41 has been left in the core 26. After the core is cut, the other hook is screwed into the opposite end. The protector is then placed against facing 12 and hooks 31 and 41 are made to engage edges 13.

Figure 5:
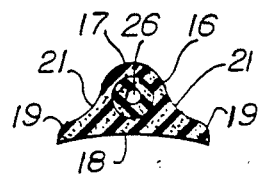
FIG. 5 is a sectional view taken substantially along line 4—4 of FIG. 3.
Figure 6:
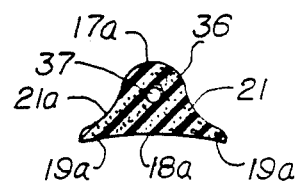
FIG. 6 is a view similar to FIG. 4 of a modification.

In the modification of FIG. 5, the external shape of protector 36 is preferably the same as tube 16 but of smaller proportions. However the overall material of protector 36 is the same as 26 and it is formed without a hole since the material is soft enough to allow insertion of screws 34 of the hooks 31 and 41. In other respects the cross-sectional shape of the protector 36 resembles that of the tube 16 and the same reference numerals followed by the subscript "a" are used to designate corresponding parts.

In use of the device of FIG. 5, the length of protector 36 is made shorter than the width of the door 11. The hooks are then screwed into the cross-sectional center of protector 36 and by reason of the resiliency of the material of the protector 36, tension is applied to the hooks on either end causing them to engage the edges of the door as in the preceding modification.

When not in use, protector 36 or tube 16 can be rolled into a small shape that will fit in a small pouch and can be stored conveniently under the car driver seat.

What is claimed is:

1. A protector for a vehicle door adjustable for various widths of doors comprising a flexible outer tube, a resilient core within said tube and hooks screwed into the opposite ends of said core, the initial length of said core being less than the door to provide tension to cause said hooks to tightly engage the edges of a door, said core being of a resilient material, the inside dimensions of said tube being slightly greater than the corresponding outside dimensions of said core, said core maintaining said tube against collapse upon contact of a foreign object with said tube, each said hook having a base about the same diameter as said core formed with a shoulder from which projects a screw, the screw engaging said core and said shoulder abutting the outer end of said core, one said hook being formed with an elongated shank to fit the front edge of said door, said core being substantially more resilient than said tube.

2. A protector according to claim 1 in which the cross-section of said tube has a central rounded protuberance to extend away from a door surface and top and bottom extensions formed outwards from said protuberance to engage said door surface to resist tendency of said protector to twist relative to said door.

3. A protector for a vehicle door adjustable for various widths of doors comprising a resilient member which in cross-section has a central, rounded protuberance to extend away from a door surface and top and bottom extensions formed outward from said protuberance to engage said door surface to resist tendency of said protector to twist relative to said door and hooks screwed into opposite ends of said resilient member, the initial length of said member being sufficiently less than said door to apply tension to said hooks to engage the edges of said door, said resilient member comprising a hollow sleeve and a core within said sleeve, said core being substantially more resilient than said sleeve, said hooks being connected to said core, the inside dimensions of said tube being slightly greater than the corresponding outside dimensions of said core, said core maintaining said tube against collapse upon contact of a foreign object with said tube.

4. A protector according to claim 3 in which said resilient member is a unitary piece of material.

* * * * *